United States Patent
Tajima et al.

(10) Patent No.: US 8,593,340 B2
(45) Date of Patent: Nov. 26, 2013

(54) INTER-MOBILE BODY CARRIER PHASE POSITIONING DEVICE AND METHOD

(75) Inventors: Yasuhiro Tajima, Nisshin (JP);
Kazunori Kagawa, Nagoya (JP);
Masafumi Uchihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 208 days.

(21) Appl. No.: 12/922,821

(22) PCT Filed: May 6, 2009

(86) PCT No.: PCT/IB2009/005489
§ 371 (c)(1),
(2), (4) Date: Sep. 15, 2010

(87) PCT Pub. No.: WO2009/136254
PCT Pub. Date: Nov. 12, 2009

(65) Prior Publication Data
US 2011/0037646 A1    Feb. 17, 2011

(30) Foreign Application Priority Data
May 7, 2008 (JP) ................................. 2008-121477

(51) Int. Cl.
*G01S 19/43* (2010.01)
(52) U.S. Cl.
USPC ..................................................... 342/357.26
(58) Field of Classification Search
CPC ................................ G01S 19/44; G01S 19/04
USPC ........................... 342/357.41, 357.26–357.27
See application file for complete search history.

(56) References Cited

U.S. PATENT DOCUMENTS

| | | | | |
|---|---|---|---|---|
| 5,825,326 A | * | 10/1998 | Semler et al. | 342/357.27 |
| 6,100,842 A | | 8/2000 | Dreier et al. | |
| 7,812,762 B2 | * | 10/2010 | Shamoto | 342/357.26 |
| 2005/0110676 A1 | | 5/2005 | Heppe et al. | |
| 2007/0057839 A1 | | 3/2007 | Kagawa | |

(Continued)

FOREIGN PATENT DOCUMENTS

| | | |
|---|---|---|
| JP | A-05-079849 | 3/1993 |
| JP | A-10-148665 | 6/1998 |

(Continued)

OTHER PUBLICATIONS

Japanese Office Action in Japanese Patent Application No. 2008-121477; dated Apr. 28, 2010 (partial English-language translation).

(Continued)

*Primary Examiner* — Harry Liu
(74) *Attorney, Agent, or Firm* — Oliff & Berridge, PLC (57) ABSTRACT

The inter-mobile body carrier phase positioning device according to the invention includes: a first observation data acquisition means that acquires observation data concerning a phase accumulation value observed in a first mobile body; a second observation data acquisition means that acquires observation data concerning a phase accumulation value observed in a second mobile body; a satellite pair determination means that determines pairs of satellites used for carrier phase positioning; and a carrier phase positioning means that takes, between each of the pairs of the satellites determined by the satellite pair determination means, a single or double difference between the observation data acquired by the first observation data acquisition means and the observation data acquired by the second observation data acquisition means, and determines relative positional relation between the first mobile body and the second mobile body by carrier phase positioning using the single or double difference of the observation data.

11 Claims, 6 Drawing Sheets

(56) References Cited

U.S. PATENT DOCUMENTS

2009/0303116 A1* 12/2009 Wirola et al. ............ 342/357.06

FOREIGN PATENT DOCUMENTS

| JP | A-2002-517731 | 6/2002 |
| JP | B2-3505494 | 3/2004 |
| JP | A-2008-039690 | 2/2008 |

OTHER PUBLICATIONS

Written Opinion of International Searching Authority in International Application No. PCT/IB2009/005489; dated Aug. 6, 2009.

International Preliminary Report on Patentability in International Application No. PCT/IB2009/005489; dated Mar. 29, 2010.

International Search Report in International Application No. PCT/IB2009/005489; dated Aug. 6, 2009.

* cited by examiner

FIG.1

20 REFERENCE STATION　　30 MOBILE BODY

INTER-MOBILE BODY CARRIER PHASE POSITIONING DEVICE AND METHOD

BACKGROUND OF THE INVENTION

1. Field of the Invention

The invention relates to an inter-mobile body carrier phase positioning device and method in which relative positional relation between mobile bodies is determined.

2. Description of the Related Art

A device for calculating relative position with the use of inter-vehicle communication has already been available, the device including a relative position calculating means using a difference in GPS signal propagation time, which determines a difference between data on GPS signal propagation time with respect to a nearby vehicle and data on GPS signal propagation time with respect to a host vehicle, and solves simultaneous equations in the three or more values of the differences in the GPS signal propagation time thus determined and the relative position, which is the unknown, to obtain the relative position of the nearby vehicle with respect to the host vehicle (see Japanese Patent Application Publication No. 10-148665 (JP-A-10-148665), for example).

In the technology described in JP-A-10-148665, for the purpose of positioning, geometrical equations are formulated that are expressed using the difference in GPS signal propagation time and the direction cosines of the angles formed between axes of the relative coordinate system and the line segment between the host vehicle and a satellite, and the equations are simultaneously solved to obtain the relative position. In such a configuration, however, there is a problem with the positioning accuracy because of the fact that only the GPS signal propagation time with large error is used as the observation data, the fact that the directional cosines of the angles formed between axes of the relative coordinate system and the line segment between the host vehicle and a satellite cannot be accurately determined, etc.

SUMMARY OF THE INVENTION

The invention provides an inter-mobile body carrier phase positioning device and method that realize highly accurate positioning.

A first aspect of the invention relates to an inter-mobile body carrier phase positioning device, which includes: a first observation data acquisition means that acquires observation data that is observed in a first mobile body and concerns a phase accumulation value of a carrier wave of a satellite signal; a second observation data acquisition means that acquires observation data that is observed in a second mobile body and concerns a phase accumulation value of the carrier wave of the satellite signal; a satellite pair determination means that determines pairs of satellites used for carrier phase positioning; and a carrier phase positioning means that takes, between each of the pairs of the satellites determined by the satellite pair determination means, a single difference or a double difference between the observation data acquired by the first observation data acquisition means and the observation data acquired by the second observation data acquisition means, and determines relative positional relation between the first mobile body and the second mobile body by carrier phase positioning with the use of the single difference or the double difference of the observation data.

In the inter-mobile body carrier phase positioning device of the first aspect, the observation data acquired by the first observation data acquisition means and the observation data acquired by the second observation data acquisition means may both include determination data on phase accumulation values of the carrier waves of common satellites and determination data on pseudoranges of the common satellites; and the relative positional relation is determined by an instantaneous positioning method in which the observation data are used independently for each epoch.

In the inter-mobile body carrier phase positioning device of the first aspect, an influence of the single difference or the double difference of the observation data, taken for each of the pairs, on positioning result may be regulated by weights, based on a difference between reciprocals of distances between the first mobile body and the pair of the satellites for each of the pairs of the satellites determined by the satellite pair determination means.

In the inter-mobile body carrier phase positioning device of the first aspect, the carrier phase positioning means may determine the relative positional relation with the use of position information of the first mobile body obtained by point positioning along with the single difference or the double difference of the observation data, and the position information of the first mobile body obtained by the point positioning may be obtained by the point positioning using only the satellites included in the pairs determined by the satellite pair determination means.

In the inter-mobile body carrier phase positioning device of the first aspect, the satellite pair determination means may determine the pairs of the satellites based on the distance between the first mobile body and each of the satellites.

In the inter-mobile body carrier phase positioning device of the first aspect, the satellite pair determination means may pair two satellites such that a difference between distances from the first mobile body to the two satellites is relatively small.

In the inter-mobile body carrier phase positioning device of the first aspect, the satellite pair determination means may pair two satellites such that a difference between reciprocals of distances from the first mobile body to the two satellites is relatively small.

In the inter-mobile body carrier phase positioning device of the first aspect, the satellite pair determination means may preferentially select the satellite, from which a distance to the first mobile body is relatively large, to incorporate into the pairs.

In the inter-mobile body carrier phase positioning device of the first aspect, when a difference between reciprocals of distances from the first mobile body to a pair of the satellites exceeds a predetermined threshold value, the satellite pair determination means may replace the pair of the satellites by another pair of the satellites.

In the inter-mobile body carrier phase positioning device of the first aspect, when an integer solution derived in the carrier phase positioning means is not fixed, the satellite pair determination means may preferentially select and use the satellite, from which a distance to the first mobile body is relatively large, to redetermine the pairs.

The inter-mobile body carrier phase positioning device may be mounted on the second mobile body, the first observation data acquisition means may acquire the observation data through radio communication with the first mobile body, and the second observation data acquisition means may acquire the observation data through observation of the satellite signal.

A second aspect of the invention relates to an inter-mobile body carrier phase positioning method, which includes: acquiring first observation data on a satellite signal observed in a first mobile body; acquiring second observation data on a satellite signal observed in a second mobile body; determining pairs of satellites used for carrier phase positioning based on distances from the first mobile body to the satellites so that two of the satellites that are close to each other in terms of the distances are paired; and taking, between each of the determined pairs of the satellites, a single difference or a double difference between the first observation data and the second observation data, and determining relative positional relation between the first mobile body and the second mobile body by carrier phase positioning.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An example embodiment for carrying out the invention will be described below with reference to drawings.

Figure 1:
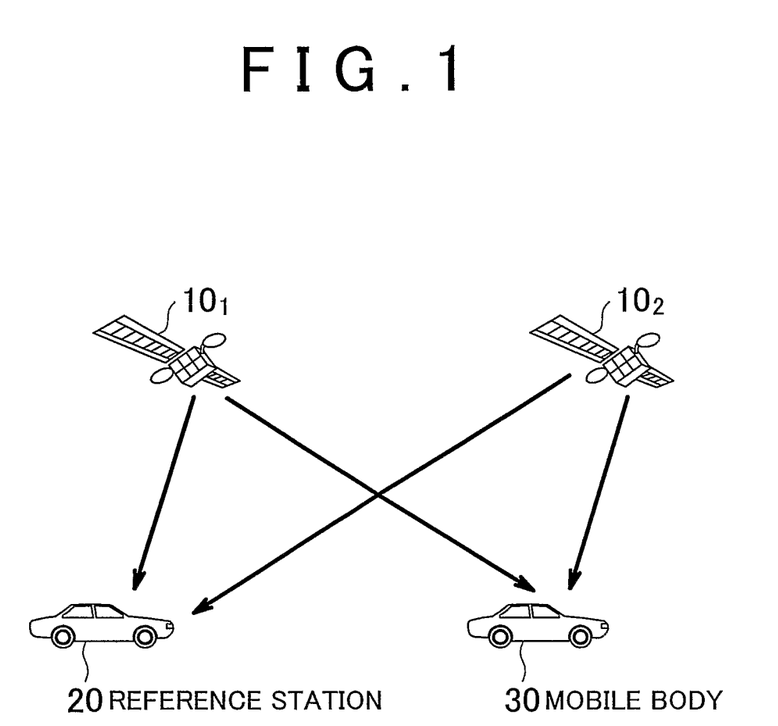
FIG. 1 is a system diagram showing an overall system of a global positioning system (GPS) to which an inter-mobile body carrier phase positioning device is applied.

FIG. 1 is a system diagram showing an overall system of a global positioning system (GPS) to which an inter-mobile body carrier phase positioning device according to the invention is applied. As shown in FIG. 1, GPS includes GPS satellites 10 that go around the Earth. Vehicles 20 and 30 are on the Earth and can move on the Earth. Note that the vehicles 20 and 30 are merely examples of mobile bodies and such mobile bodies include bicycles, trains, ships, aircrafts, forklifts, robots, information terminals, such as mobile phones, that move with people carrying the terminals, etc.

The vehicle 20 is a vehicle that functions as a reference station and hereinafter also referred to as the "reference station." The vehicle 20 however is a mobile reference station unlike the common fixed reference station.

The vehicle 30 is a subject vehicle of which the position relative to the vehicle 20 (reference station) is determined, and is a vehicle equipped with the inter-mobile body carrier phase positioning device of this embodiment. The vehicle 30, however, may function as the reference station for another vehicle (vehicle 20, for example) depending on the circumstances.

The GPS satellites 10 broadcast navigation messages to the Earth at all times. The navigation message includes a correction coefficient related to the ionosphere, a correction value of the clock, and information on the orbit of the corresponding GPS satellite 10. The navigation message is encoded using C/A code and modulated onto L1 carrier wave (frequency: 1575.42 MHz), and is broadcast to the Earth at all times.

There are twenty four of GPS satellites 10 going around the Earth at the altitude of approximately 20,000 km, and four of the GPS satellites 10 are evenly arranged in each of six circum-earth orbits that are angled with respect to each other at angular intervals of 55 degrees. Thus, as long as the place open to the sky, it is possible to observe at least five or more GPS satellites 10 anywhere on the Earth at all times.

Figure 2:
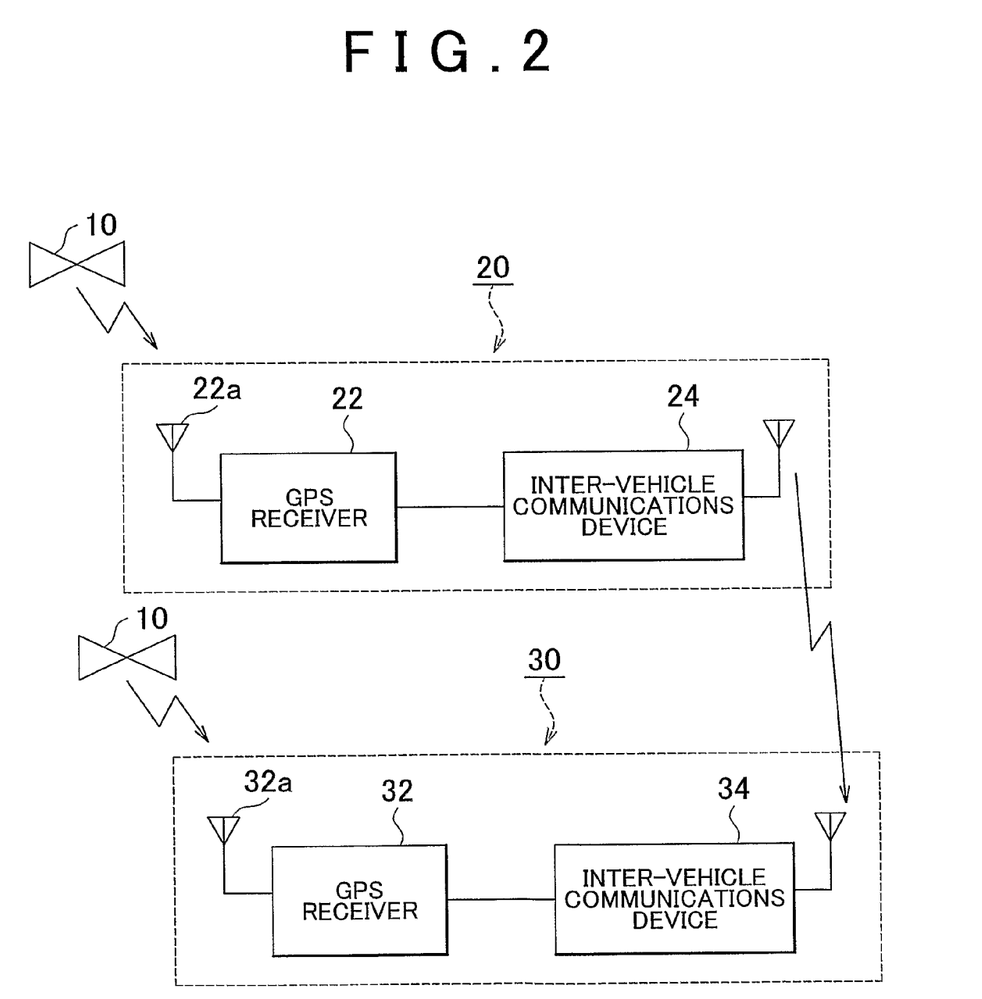
FIG. 2 is a diagram showing main components in a vehicle 20 and a vehicle 30.

FIG. 2 is a diagram showing main components in the vehicle 20 and the vehicle 30. The vehicle 20 is provided with a GPS receiver 22 and an inter-vehicle communications device 24. The vehicle 30 is provided with a GPS receiver 32 and an inter-vehicle communications device 34.

The GPS receivers 22 and 32 each have an oscillator (not shown) therein of which the frequency is the same as the carrier wave frequency of the GPS satellites 10. The GPS receivers 22 and 32 convert the radio wave (satellite signal), received from the GPS satellites 10 through GPS antennas 22a and 32a, into a signal with an intermediate frequency and then perform C/A code synchronization using the C/A codes generated in the GPS receivers 22 and 32, thereby extracting the navigation messages.

The GPS receiver 22 determines an accumulation value $\Phi_{ik}(t)$ of the carrier wave phase at time t as shown by the following equation, based on the carrier wave sent from the GPS satellite $10_i$. The phase accumulation value $\Phi_{ik}$ may be determined for each of the L1 wave and L2 wave (frequency: 1227.6 MHz).

$$\Phi_{ik}(t) = \Theta_{ik}(t) - \Theta_{ik}(t - \tau_k) + N_{ik} + \epsilon_{ik}(t) \quad (1)$$

Note that the subscript i (=1, 2, ...) of the phase accumulation value $\Phi_{ik}$ is the number assigned to the GPS satellite $10_i$, and the subscript k means that the phase accumulation value $\Phi_{ik}$ is the accumulation value on the reference station side. In addition, $N_{ik}$ is an integer ambiguity and $\epsilon_{ik}$ is a noise (error).

The GPS receiver 22 determines a pseudorange $\rho_{ik}$ based on the C/A code modulated onto each of the carrier waves sent from the GPS satellites $10_i$.

$$\rho_{ik}(t) = c \cdot \tau_k + b_k \quad (2)$$

In this equation, c is light speed and $b_k$ is referred to as clock bias, which corresponds to distance error due to the error in the clock in the GPS receiver 22.

The vehicle 20 transmits the phase accumulation value $\Phi_{ik}$ and the pseudorange $\rho_{ik}$ determined in the GPS receiver 22 to the vehicle 30 through the inter-vehicle communications device 24.

The GPS receiver 32 similarly determines a phase accumulation value $\Phi_{iu}$ of a carrier wave phase based on the carrier waves received from the GPS satellites $10_i$. The phase accumulation value $\Phi_{iu}$ may be determined for each of the L1 wave and the L2 wave. Note that the subscript i (=1, 2, ...) of the phase accumulation value $\Phi_{iu}$ is the number assigned to the GPS satellite $10_i$, and the subscript u means that the phase accumulation value $\Phi_{iu}$ is the accumulation value on the vehicle 30 side. Similarly, the phase accumulation value $\Phi_{iu}$ is obtained as the difference between a phase $\Theta_{iu}(t)$ of the oscillator at carrier wave reception time t and the carrier wave phase $\Theta_{iu}(t-\tau)$ at the time of generation of the satellite signal in the GPS satellite $10_i$.

$$\Phi_{iu}(t)=\Theta_{iu}(t)-\Theta_{iu}(t-\tau_u)+N_{iu}+\epsilon_{iu}(t) \quad (3)$$

In this equation, $\tau_u$ is the time of travel from the GPS satellite 10 to the GPS receiver 32 and $\epsilon_{iu}$ is a noise (error). Note that at the time the observation of the phase difference is started, although the GPS receiver 32 can accurately determine the phase within a cycle of the carrier wave, the GPS receiver 32 cannot identify the cycle number. Thus, as shown in the above equation, an integer ambiguity $N_{iu}$, which is the ambiguity term, is included in the phase accumulation value $\Phi_{iu}(t)$.

The GPS receiver 32 determines a pseudorange $\rho_{iu}$ based on the C/A code modulated onto each of the carrier waves sent from the GPS satellites $10_i$. The pseudorange $\rho_{iu}$ determined in the GPS receiver 32 includes the error, such as the distance error, as shown in the following equation.

$$\rho_{iu}(t)=c\cdot\tau_u+b_u \quad (4)$$

In this equation, $b_u$ is referred to as clock bias, which corresponds to distance error due to the error in the clock in the GPS receiver 32.

In addition to the determination as described above, the GPS receiver 32 performs various processes described below with reference to FIG. 3.

The inter-vehicle communications devices 24 and 34 are designed to interactively communicate with each other. In this embodiment, the inter-vehicle communications device 24 of the vehicle 20 that functions as the reference station transmits the phase accumulation value $\Phi_{ik}$ and the pseudorange $\rho_{ik}$ that are determined in the GPS receiver 22, to the inter-vehicle communications device 34 of the vehicle 30 through a radio communication network. In the following description, the data on the phase accumulation value $\Phi_{ik}$ and the pseudorange $\rho_{ik}$ that are determined in the GPS receiver 22 is also collectively referred to as the "observation data," the data on the phase accumulation value $\rho_{ik}$ is also referred to as the "L1 data" and the "L2 data," corresponding to the L1 wave and the L2 wave, respectively, and the data on the pseudorange $\rho_{ik}$ is also referred to as the "C/A data".

Figure 3:
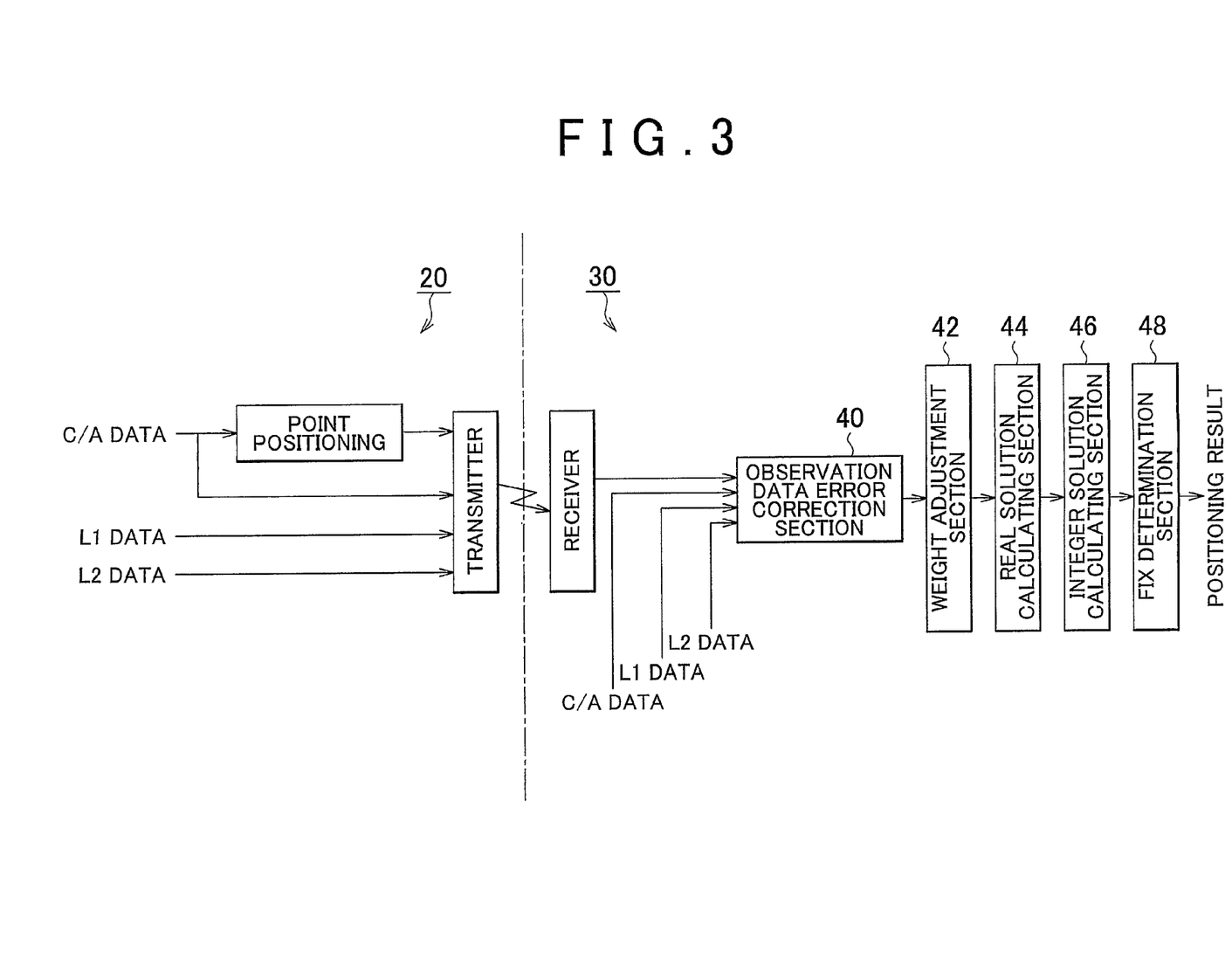
FIG. 3 is a block diagram showing important processes executed in the vehicles 20 and 30 of an embodiment.

FIG. 3 is a block diagram showing important processes executed in the vehicles 20 and 30 of this embodiment. Note that, concerning the configuration in the vehicle 30, while sections 42, 44, 46, and 48 are implemented by the GPS receiver 32 in this embodiment, these sections may be implemented by another microcomputer or the like connected to the GPS receiver 32.

As shown in FIG. 3, in the vehicle 20 that functions as the reference station, data to be transmitted, which is the observation data including the L1 data, L2 data, and C/A data that are observed, is generated every predetermined period of time and supplied to the vehicle 30. In the vehicle 20, the position of the vehicle 20 is determined every predetermined period of time and the determined position is supplied to the vehicle 30. The positioning may be realized by point positioning using the observed C/A data, for example. The point positioning method using C/A data is widely available and the description thereof is omitted.

The vehicle 30 receives the observation data from the reference station side every predetermined period of time. The GPS receiver 32 acquires the phase accumulation value $\Phi_{iu}$ (L1 data and L2 data) and the pseudorange $\rho_{iu}$ (C/A data) on the vehicle 30 side. The observation data on the reference station side and the observation data on the vehicle 30 side may be synchronized using GPS time, a pulse-per-second (PSS) signal, or the like. The observation data on the reference station side and the observation data on the vehicle 30 side are first supplied to an observation data error correction section 40.

In the observation data error correction section 40, the error in the observation data is eliminated by appropriately pairing the observation data on the reference station side and the observation data on the vehicle 30 side. The specific process executed in the observation data error correction section 40 will be described later. In the observation data error correction section 40, basically, a plurality of pairs of the GPS satellites 10 that are used in the inter-vehicle real time kinematic (RTK) positioning are selected from the plurality of satellites 10 that can be observed by both the reference station and the vehicle 30, in such a manner that principal error components $\Delta$ of the inter-vehicle RTK positioning are minimized. Specifically, a plurality of pairs of the GPS satellites 10, between each of which the double difference of the observation data is taken, are determined so that the principal error components $\Delta$ of the inter-vehicle RTK positioning are minimized. The number of pairs of the GPS satellites 10 that are determined is four or more, which is required for positioning.

Each of the principal error components $\Delta$ of the inter-vehicle RTK positioning is expressed by the following equation.

$$\Delta_{jh}=\epsilon(1/D_{jk}-1/D_{hk})$$

In the above equation, $D_{jk}$ is the distance between the vehicle 20 and the GPS satellite $10_j$ and calculated based on the result of positioning of the vehicle 20 (result of the above-mentioned point positioning, for example) and the position of the GPS satellite $10_j$. The position of the GPS satellite $10_j$ may be calculated using the satellite orbit information contained in the navigation message, and/or the calendar data provided by an organization, such as the international GPS service (IGS). Similarly, $D_{hk}$ is the distance between the vehicle 20 and the GPS satellite $10_h$ and calculated based on the result of positioning of the vehicle 20 (result of the above-mentioned point positioning, for example) and the position of the GPS satellite $10_h$. The meaning of the error components $\Delta$ that are expressed by the equation, $\Delta_{jh}=\epsilon(1/D_{jk}-1/D_{hk})$, will be described later.

The weight adjustment section 42 determines the weighting coefficients w (weight components of a matrix) used in the real solution calculating section 44 described later, and adjusts the weight for each pair of the GPS satellites 10. Basically, in the weight adjustment section 42, in order that the result of positioning is not significantly affected, a lower weight is assigned to a pair with a larger error component $\Delta$ described later, as compared to a pair with a smaller error component $\Delta$.

In the real solution calculating section 44, the position of the vehicle 30 (typically, the relative position with respect to the vehicle 20) is determined by the least square method, in which the observed amount is the double difference of the observation data and state variables are the position of the vehicle 30 and the double difference of the integer ambiguity. For example, the position of the vehicle 30 may be determined in the procedure described below. Although, in the description below, for the sake of simplicity, a case is described where the phase accumulation value of the L1 wave only is used, when the phase accumulation value of the L2 wave is also used, the phase accumulation value of the L2 wave may be additionally dealt with similarly to the case of the phase accumulation value of the L1 wave.

The double difference of the phase accumulation values of the two GPS satellites $10_j$ and $10_h$ (i=j, h, j≠h) that are paired is expressed by the following equation.

$$\Phi^{jh}_{ku}=(\Phi_{jk}(t)-\Phi_{ju}(t))-(\Phi_{hk}(t)-\Phi_{hu}(t)) \quad (5)$$

Meanwhile, because of the physical meaning, (distance between GPS satellite $10_i$ and GPS receiver 22 or 32)=(wave length L of carrier wave)×(phase accumulation value), the double difference $\Phi^{jh}_{ku}$ of the phase accumulation value is expressed as follows.

$$\Phi^{jh}_{ku} = \frac{\left[\left\{\sqrt{(X_k(t)-X_j(t))^2+(Y_k(t)-Y_j(t))^2+(Z_k(t)-Z_j(t))^2} - \sqrt{(X_u(t)-X_j(t))^2+(Y_u(t)-Y_j(t))^2+(Z_u(t)-Z_j(t))^2}\right\} - \left\{\sqrt{(X_k(t)-X_h(t))^2+(Y_k(t)-Y_h(t))^2+(Z_k(t)-Z_h(t))^2} - \sqrt{(X_u(t)-X_h(t))^2+(Y_u(t)-Y_h(t))^2+(Z_u(t)-Z_h(t))^2}\right\}\right]}{L} + N^{jh}_{ku}+\varepsilon^{jh}_{ku} \quad (6)$$

In this equation (6), $(X_k(t), Y_k(t), Z_k(t))$ are coordinates of the reference station 20 in the world coordinate system at time t, $(X_u(t), Y_u(t), Z_u(t))$ are coordinates (unknown) of the vehicle 30 at time t, and $(X_j(t), Y_j(t), Z_j(t))$ and $(X_h(t), Y_h(t), Z_h(t))$ are coordinates of the GPS satellites $10_j$ and $10_h$ at time t, respectively. $N^{jh}_{ku}$ is the double difference of the integer ambiguity, that is, $N^{jh}_{ku}=(N_{jk}-N_{ju})-(N_{hk}-N_{hu})$. Note that time t is synchronized based on the GPS time, for example.

The double difference of the pseudoranges with respect to the two GPS satellites $10_j$ and $10_h$ (i=j, h, j≠h) at time t is expressed by the following equation.

$$\rho^{jh}_{ku}=(\rho_{jk}(t)-\rho_{ju}(t))-(\rho_{hk}(t)-\rho_{hu}(t)) \quad (7)$$

The double difference $\rho^{jh}_{ku}$ of the pseudorange is expressed as follows.

$$\rho^{jh}_{ku} = \left\{\sqrt{(X_k(t)-X_j(t))^2+(Y_k(t)-Y_j(t))^2+(Z_k(t)-Z_j(t))^2} - \sqrt{(X_u(t)-X_j(t))^2+(Y_u(t)-Y_j(t))^2+(Z_u(t)-Z_j(t))^2}\right\} - \left\{\sqrt{(X_k(t)-X_h(t))^2+(Y_k(t)-Y_h(t))^2+(Z_k(t)-Z_h(t))^2} - \sqrt{(X_u(t)-X_h(t))^2+(Y_u(t)-Y_h(t))^2+(Z_u(t)-Z_h(t))^2}\right\} \quad (8)$$

$(X_k(t), Y_k(t), Z_k(t))$, $(X_u(t), Y_u(t), Z_u(t))$, $(X_j(t), Y_j(t), Z_j(t))$, and $(X_h(t), Y_h(t), Z_h(t))$ in the equation (8) are the same as those of the above equation (6). Note that time t is synchronized based on the GPS time, for example.

The relation between an observed amount Z and a state variable is expressed by the following linear model.

$$Z=H\cdot\eta+V \quad (9)$$

In this equation, V is an observation noise. η represents state variables, which are coordinates (unknown) of the vehicle 30 and the double difference of the integer ambiguity. For example, $\eta=[X_u, Y_u, Z_u, N^{12}_{ku}, N^{13}_{ku}, N^{14}_{ku}, N^{15}_{ku}]^T$ (superscript T means transpose) when the pairs (j, h) of the GPS satellites 10 are four pairs (1, 2), (1, 3), (1, 4), and (1, 5). The observed amount Z in the equation (9) is the double difference $\Phi^{jh}_{ku}$ of the phase accumulation value (see the above equation (5)) and the double difference $\rho^{jh}_{ku}$ of the pseudorange (see the above equation (7)). For example, $Z=[\Phi^{12}_{ku}, \Phi^{13}_{ku}, \Phi^{14}_{ku}, \Phi^{15}_{ku}, \rho^{12}_{ku}, \rho^{13}_{ku}, \rho^{14}_{ku}, \rho^{15}_{ku}]^T$ when the pairs (j, h) of the GPS satellites 10 are four pairs (1, 2), (1, 3), (1, 4), and (1, 5). Although the observation equation (9) is linear, the observed amount Z is non-linear with respect to the state variables $X_u$, $Y_u$, and $Z_u$ in the equations (6) and (8), and therefore, each of the terms in the equations (6) and (8) is partially differentiated with respect to the state variables $X_u$, $Y_u$, and $Z_u$, whereby the observation matrix H of the above equation (9) is obtained. For example, when the pairs (j, h) of the GPS satellites 10 are four pairs (1, 2), (1, 3), (1, 4), and (1, 5), the observation matrix H is as follows.

$$H = \begin{bmatrix} H_1 \\ H_2 \end{bmatrix} = \begin{pmatrix} \frac{\partial Z_{1\,ku}^{12}}{\partial x_u} & \frac{\partial Z_{1\,ku}^{12}}{\partial y_u} & \frac{\partial Z_{1\,ku}^{12}}{\partial z_u} & 1 & & & \\ & & & & 1 & & \\ \cdot & \cdot & \cdot & & & 1 & \\ \cdot & \cdot & \cdot & & & & 1 \\ \frac{\partial Z_{1\,ku}^{15}}{\partial x_u} & \frac{\partial Z_{1\,ku}^{15}}{\partial y_u} & \frac{\partial Z_{1\,ku}^{15}}{\partial z_u} & & & & \\ \hline \frac{\partial Z_{2\,ku}^{12}}{\partial x_u} & \frac{\partial Z_{2\,ku}^{12}}{\partial y_u} & \frac{\partial Z_{2\,ku}^{12}}{\partial z_u} & & & & \\ \cdot & \cdot & \cdot & & & & \\ \cdot & \cdot & \cdot & & 0 & & \\ \frac{\partial Z_{2\,ku}^{15}}{\partial x_u} & \frac{\partial Z_{2\,ku}^{15}}{\partial y_u} & \frac{\partial Z_{2\,ku}^{15}}{\partial z_u} & & & & \end{pmatrix} \quad (10)$$

$H_1$ in the equation (10) is an observation matrix when the observed amount $Z_1$ is expressed as $Z_1=[\Phi^{12}_{ku}, \Phi^{13}_{ku}, \Phi^{14}_{ku}, \Phi^{15}_{ku}]^T$ and $H_2$ in the equation (10) is an observation matrix when the observed amount $Z_2$ is expressed as $Z_2=[\rho^{12}_{ku}, \rho^{13}_{ku}, \rho^{14}_{ku}, \rho^{15}_{ku}]^T$, so that the observation matrix H includes the two observation matrices $H_1$ and $H_2$.

When the above equation (9) is solved by least square method using the observation matrix H of the equation (10), the real solution (float solution) of η can be obtained as follows.

$$\eta=(H^T\cdot W\cdot H)^{-1}\cdot H^T\cdot W\cdot Z \quad (11)$$

W is a weight matrix of which the weights are adjusted in the weight adjustment section 42, and for example, when the pairs (j, h) of the GPS satellites 10 are four pairs (1, 2), (1, 3), (1, 4), and (1, 5), the weight matrix W is as follows.

$$W = \begin{pmatrix} w_1 & & & & & & & \\ & w_2 & & & & & & \\ & & w_3 & & & 0 & & \\ & & & w_4 & & & & \\ & & & & w_{\rho 1} & & & \\ & & & & & w_{\rho 2} & & \\ & 0 & & & & & w_{\rho 3} & \\ & & & & & & & w_{\rho 4} \end{pmatrix} \quad (12)$$

The diagonal elements $w_1$, $w_2$, $w_3$, and $w_4$ are weighting coefficients related to the observed amount $Z_1$ and the diagonal elements $w_{\rho 1}$, $w_{\rho 2}$, $w_{\rho 3}$, and $w_{\rho 4}$ are weighting coefficients related to the observed amount $Z_2$. These coefficients may be determined using the principal error components $\Delta_{jh}$ of the inter-vehicle RTK positioning. For the pair (1, 2) of the GPS satellites 10 as a representative example, $w_1$ may be expressed as $w_1 = |1/\Delta_{12}|$, and in this case, $w_{\rho 1}$ may be expressed, using a coefficient $\gamma$ ($\gamma$ is between $\frac{1}{200}$ and $\frac{1}{100}$, for example), as $w_{\rho 1} = \gamma |1/\Delta_{12}|$. Alternatively, for the pair (1, 2) of the GPS satellites 10 as a representative example, $w_1$ may be expressed as $w_1 = (1/\Delta_{12})^2$, and in this case, $w_{\rho 1}$ may be expressed, using a coefficient $\gamma$ ($\gamma$ is between $\frac{1}{200}$ and $\frac{1}{100}$, for example), as $w_{\rho 1} = \gamma (1/\Delta_{12})^2$. In consideration of the fact that the C/A data is lower in accuracy than L1 data (or L2 data), $w_{\rho 1}$ is set less than $w_1$ by using the coefficient $\gamma$ less than 1.

In the integer solution calculating section 46, an integer solution of the integer ambiguity is calculated based on the real solution (float solution) of the integer ambiguity calculated in the real solution calculating section 44. For example, an integer solution (wave number) with the minimum error with respect to the real solution calculated in the real solution calculating section 44 is determined as the first candidate, and an integer solution with the next minimum error is determined as the second candidate. As a method of performing this process, the LAMBDA method may be used in which decorrelation of the integer ambiguity is performed to reduce the size of the integer search space, and then the solution is determined. Alternatively, instead of the LAMBDA method, another integer least square method or simple rounding off may be used to derive the integer solution.

In the FIX determination section 48, it is determined whether the integer solution derived in the integer solution calculating section 46 is employed as the solution. Specifically, the reliability of the integer solution derived in the integer solution calculating section 46 is determined, and when an integer solution with high reliability is obtained, the integer solution is fixed and thereafter, the RTK positioning using this integer solution is performed to output the result of positioning. There are various methods of determining the reliability of an integer solution, and any appropriate method may be used. For example, the reliability of an integer solution may be determined using a ratio test. For the purpose of explaining an example of the ratio test, it is assumed that the pairs (j, h) of the GPS satellites 10 are four pairs (1, 2), (1, 3), (1, 4), and (1, 5), and four real solutions ($n^{12}$, $n^{13}$, $n^{14}$, $n^{15}$) of the integer ambiguities, first) candidates ($N^{12}_1$, $N^{13}_1$, $N^{14}_1$, $N^{15}_1$) and second candidates ($N^{12}_2$, $N^{13}_2$, $N^{14}_2$, $N^{15}_2$) of the integer ambiguities are calculated. In this case, as shown below, the ratio R is the ratio of a first norm to a second norm, the first norm being the norm between the real solutions of the integer ambiguities and the second candidates of the integer solutions of the integer ambiguities, the second norm being the norm between the real solutions of the integer ambiguities and the first candidates of the integer solutions of the integer ambiguities.

$$R = \{(n^{12}-N^{12}_2)^2 + (n^{13}-N^{13}_2)^2 + (n^{14}-N^{14}_2)^2 + (n^{15}-N^{15}_2)^2\} / \{(n^{12}-N^{12}_1)^2 + (n^{13}-N^{13}_1)^2 + (n^{14}-N^{14}_1)^2 + (n^{15}-N^{15}_1)^2\} \quad (13)$$

In general, the higher the value of the ratio R is, the higher the reliability of the first candidates of the integer solutions of the integer ambiguities is. Thus, an appropriate predetermined threshold value $\alpha$ may be set, and when the ratio R is higher than the predetermined threshold value $\alpha$, it may be determined that the reliability of the integer solution is high and the first candidates of the integer solutions of the integer ambiguities may be accepted.

Next, the process of determining pairs executed in the observation data error correction section 40 will be described.

Figure 4:
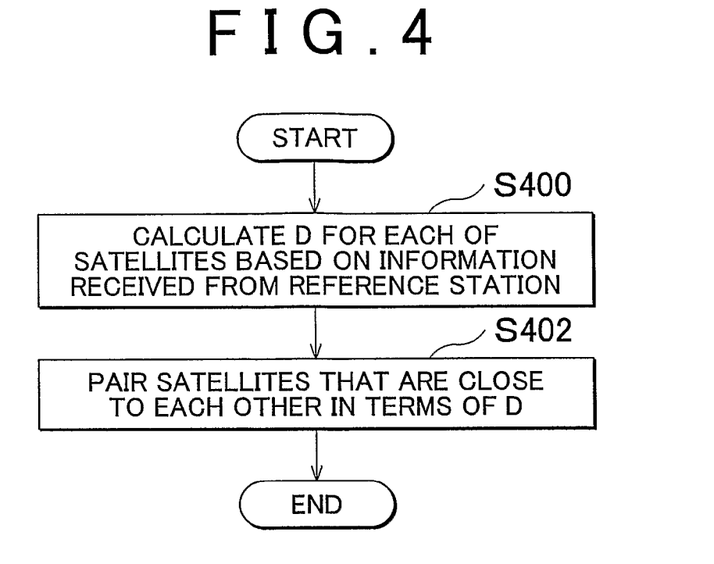
FIG. 4 is a flow chart showing an example of a pair determining process executed in an observation data error correction section 40.

FIG. 4 is a flow chart showing an example of the pair determining process executed in the observation data error correction section 40.

In step 400, the distance $D_{ik}$ between the vehicle 20 and the GPS satellite $10_i$ is calculated based on the result of positioning of the vehicle 20 supplied from the vehicle 20 (reference station). In this step, the GPS satellites $10_i$, for each of which the distance $D_{ik}$ is calculated, may be all of the common GPS satellites 10 that are being observed by both the vehicle 20 and the vehicle 30. The positions of the GPS satellites $10_i$ may be calculated using the satellite orbit information contained in the navigation message and/or the calendar data provided by an organization, such as the international GPS service (IGS).

In step 402, two GPS satellites $10_i$ that are close to each other in terms of the distance $D_{ik}$ are paired based on the distances $D_{ik}$ with respect to the GPS satellites $10_i$ obtained in step 400. Thus, it is possible to determine the pairs such that the principal error components $\Delta_{jh}$ ($= \epsilon(1/D_{jk} - 1/D_{hk})$) of the inter-vehicle RTK positioning are small. As a result, the accuracy of the result of positioning performed using the thus determined pairs becomes high. Note that the number of pairs determined in step 402 only has to be greater than the number of pairs that is required for the positioning calculation. For example, the number may be four (fixed value) or otherwise, the number may be equal to or greater than four and variable. In the latter case, the number may be varied depending on the degree of closeness between the distances $D_{ik}$, for example.

The principal error components $\Delta$ ($= \epsilon(1/D_{jk} - 1/D_{hk})$) of the inter-vehicle RTK positioning are obtained by expanding the equations (6) and (8) around the coordinates ($X_k$, $Y_k$, $Z_k$) of the vehicle 20 and extracting the principal, point positioning error components. Specifically, in the case of the equation (6), for example, when $X_k$ is taken and the equation (6) is partially differentiated with respect to $X_k$, the following equation is obtained.

$$\frac{\partial \Phi^{jh}_{ku}}{\partial X_k} = -\frac{1}{L} \frac{X_j - X_k}{\sqrt{(X_j - X_k)^2 + (Y_j - Y_k)^2 + (Z_j - Z_k)^2}} + \frac{1}{L} \frac{X_h - X_k}{\sqrt{(X_h - X_k)^2 + (Y_h - Y_k)^2 + (Z_h - Z_k)^2}} \quad (14)$$

Because the point positioning error is sufficiently smaller than the value of the denominator (actual distance between the vehicle 20 and the GPS satellite $10_j$), when the root portions of the denominator are expressed by the distances $D_{jk}$ and $D_{hk}$ calculated using the point positioning result and the left side of the equation (14) is represented by A, the equation (14) is expressed as follows.

$$A = \frac{1}{L} \frac{X_h - X_k}{D_{hk}} - \frac{1}{L} \frac{X_j - X_k}{D_{jk}} \quad (15)$$

Meanwhile, with regard to the numerator, when the point positioning error in the $X_k$ direction is $\epsilon$, that is, when $X_k$ obtained by point positioning is expressed, using the true value $X_{kr}$, by the equation $X_{kr} = X_k + \epsilon$, the equation (15) is expressed by the following equation, whereby the point positioning error component $\Delta_{jh}(=\epsilon(1/D_{jk}-1/D_{hk}))$ is extracted.

$$A = \frac{1}{L}\frac{X_h - X_k - \epsilon}{D_{hk}} - \frac{1}{L}\frac{X_j - X_k - \epsilon}{D_{jk}} \quad (16)$$

$$= \underbrace{-\frac{1}{L}\frac{\epsilon}{D_{hk}} + \frac{1}{L}\frac{\epsilon}{D_{jk}}}_{\text{Error Component}} + \frac{1}{L}\frac{X_h - X_k}{D_{hk}} - \frac{1}{L}\frac{X_j - X_k}{D_{jk}}$$

Note that while $X_k$ only is taken in the above description, $\Delta_{jh}$ in the similar form (different only in $\epsilon$) are extracted also with respect to $Y_k$ and $Z_k$.

Thus, according to the process shown in FIG. 4, two of the GPS satellites $10_i$ are paired that are close to each other in terms of the distance $D_{ik}$, and the inter-vehicle RTK positioning is performed using the pairs of the GPS satellites $10_i$, so that it is possible to avoid the problem characteristic of the inter-vehicle RTK positioning, that is, the deterioration in the positioning accuracy caused by using the coordinates that are obtained by point positioning (accuracy is in the order of one meter) instead of the coordinates that are accurately determined as the coordinates on the reference station side (accuracy is in the order of one millimeter). Specifically, according to the process shown in FIG. 4, two of the GPS satellites $10_i$ are paired that are close to each other in terms of the distance $D_{ik}$, and the inter-vehicle RTK positioning is performed using the pairs of the GPS satellites $10_i$, so that, even when the coordinates on the reference station side are determined by a positioning method with low accuracy, such as point positioning, it is possible to minimize the influence of such a positioning method and realize highly accurate positioning.

Next, a preferable example of the method of calculating coordinates on the vehicle 20 (reference station) side will be described with reference to FIG. 5.

Figure 5:
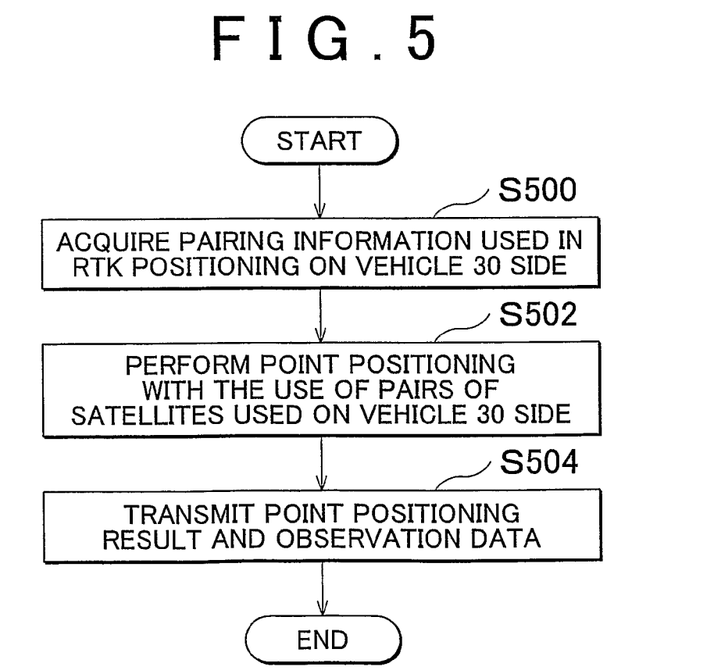
FIG. 5 is a flow chart showing a preferable example of the method of calculating coordinates on the vehicle 20 side used in inter-vehicle RTK positioning of the embodiment.

FIG. 5 is a flow chart showing a preferable example of the method of calculating coordinates on the vehicle 20 side used in the inter-vehicle RTK positioning of this embodiment. The process shown in FIG. 5 is executed in the GPS receiver 22 on the vehicle 20 side.

In step 500, the information for identifying the pairs of the GPS satellites $10_i$ used in the RTK positioning on the vehicle 30 side is acquired from the vehicle 30 through communication between the inter-vehicle communications devices 24, 34. Specifically, the GPS receiver 22 acquires the information for identifying the pairs of the GPS satellites $10_i$ determined by the above-described process shown in FIG. 4.

In step 502, the position of the vehicle 20 is determined by point positioning with the use of the GPS satellites $10_i$ alone that are included in the pairs of the GPS satellites $10_i$ used in the RTK positioning. For example, if the pairs (j, h) of the GPS satellites $10_i$ used in the RTK positioning on the vehicle 30 side are four pairs (1, 2), (1, 3), (1, 4), and (1, 5), even when another GPS satellite $10_i$ (GFS satellite $10_6$, for example) can be observed by the vehicle 30, the C/A data of the five GPS satellites $10_1$, $10_2$, $10_3$, $10_4$, and $10_5$ are used to determine the position of the vehicle 20 by point positioning.

In step 504, the result of point positioning (coordinates of the position of the vehicle 20) obtained in the above step 502 is transmitted, along with the observation data, to the vehicle 30 through communication between the inter-vehicle communications devices 24, 34.

In this way, according to the process shown in FIG. 5, the position of the vehicle 20 is determined by point positioning with the use of the GPS satellites $10_i$ alone that are included in the pairs of the GPS satellites $10_i$ used in the RTK positioning on the vehicle 30 side, and therefore, when the RTK positioning is performed on the vehicle 30 side with the use of this positioning result, the influence of the point positioning error present in the position of the vehicle 20 is efficiently reduced, and it is therefore possible to realize highly accurate positioning.

Note that the process shown in FIG. 5 may be executed in the GPS receiver 32 on the vehicle 30 side. This is because the GPS receiver 32 on the vehicle 30 side receives the observation data (C/A data) from the GPS receiver 22 and therefore, it is possible to determine the position of the vehicle 20 by point positioning also by using the GPS receiver 32 on the vehicle 30 side. With this configuration, it is possible to reduce the amount of communication between the vehicle 20 and the vehicle 30.

Figure 6:
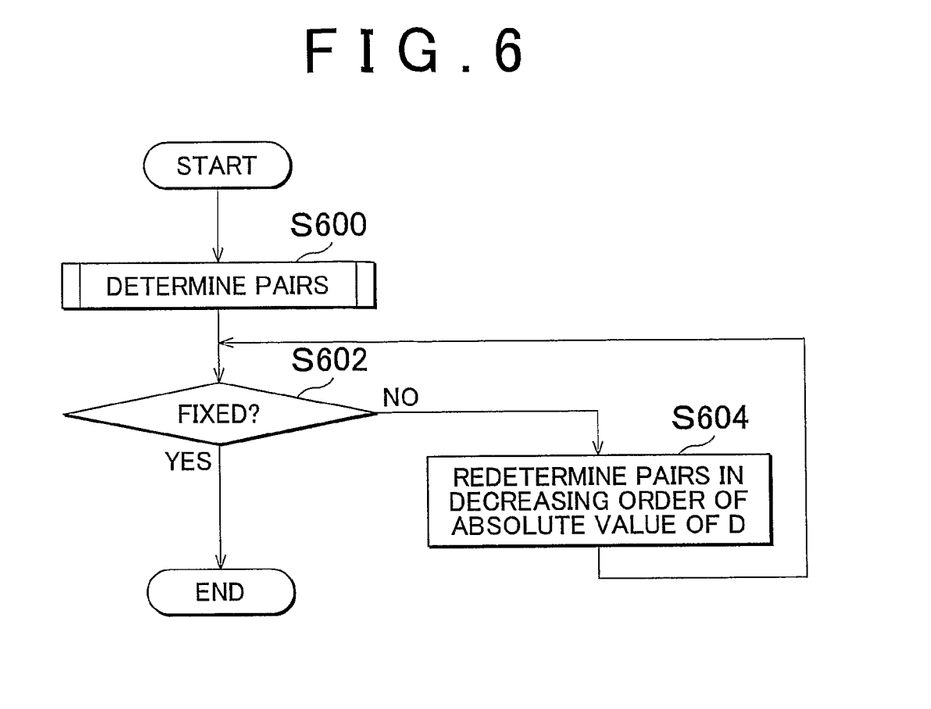
FIG. 6 is a flow chart showing an example of a pair redetermining process executed in the observation data error correction section 40 that may be executed after the above-described pair determining process shown in FIG. 4 is executed.

FIG. 6 is a flow chart showing an example of the pair redetermining process executed in the observation data error correction section 40 that may be executed after the above-described pair determining process shown in FIG. 4 is executed.

In step 600, the pairs of the GPS satellites $10_i$ used in the positioning calculation are determined by the above-described pair determining process shown in FIG. 4, for example. Once the pairs are determined, the processes executed in the sections 42, 44, 46, and 48 are executed using the determined pairs as described above. Note that as the position of the vehicle 20 used in the real solution calculating section 44, the positioning result obtained in the above-described process shown in FIG. 5 is preferably used.

In step 602, it is determined whether the integer solution obtained using the pairs determined in step 600 is fixed based on the result of determination in the FIX determination section 48. When the integer solution is fixed, it is determined that the pairs determined in step 600 are appropriate, and the process ends. On the other hand, when the integer solution is not fixed, the process proceeds to step 604.

In step 604, pairing is performed in the decreasing order of the absolute value $D_{ik}$ of the denominator so that the error components $\Delta$ are small, and the pairs of the GPS satellites $10_i$ used in the positioning calculation are redetermined. For example, given that a reference satellite is used to secure the linear independence between the observed amounts, the GPS satellite $10_i$, of which the absolute value of $D_{ik}$ is the greatest, may be set as the reference satellite, and four GPS satellites $10_i$, of which the absolute values of $D_{ik}$ are the next greatest, may be selected and each paired with the reference satellite to determine four pairs. When no reference satellite is used, four or five GPS satellites $10_i$, of which the absolute values of $D_{ik}$ are the greatest may be selected to determine four pairs from the selected four or five GPS satellites $10_i$. In this case, similarly to the manner in which the process shown in FIG. 4 is executed, four pairs may be determined by pairing two of the selected four GPS satellites $10_i$ that are close to each other in terms of $D_{ik}$.

According to the process shown in FIG. 6, even when the integer solution is not fixed in the FIX determination section 48, the pairs of the GPS satellites $10_i$ used in the positioning calculation are redetermined so that the error components $\Delta$ are small, and therefore, it is possible to properly avoid the situation in which the integer solution is not fixed in the FIX determination section 48 and positioning therefore cannot be performed.

In the process shown in FIG. 6, when the pairs of the GPS satellites $10_i$ used in the positioning calculation are redetermined in step 604, the process shown in FIG. 5 may be accordingly executed and the position of the vehicle 20 may be determined by point positioning with the use of the GPS satellites $10_i$ alone that are included in the redetermined pairs.

Next, some other examples of the process of determining pairs that is executed in the observation data error correction section 40 will be described. Each of the pair determining processes described below may be executed instead of the pair determining process shown in FIG. 4 or may be used in the pair redetermining process (step 604) shown in FIG. 6.

Figure 7:
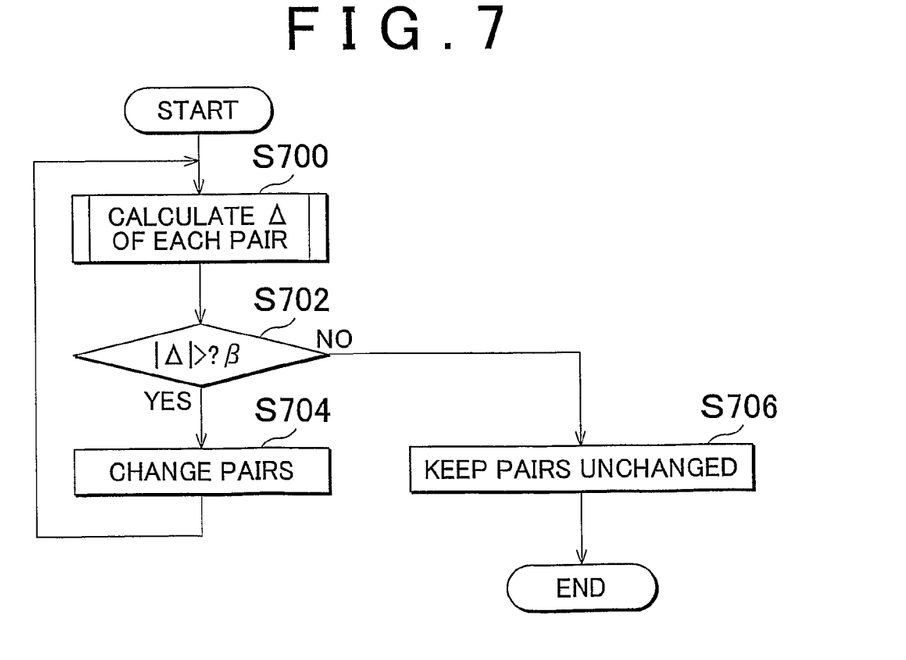
FIG. 7 is a flow chart showing another example of the pair determining process executed in the observation data error correction section 40.

FIG. 7 is a flow chart showing another example of the pair determining process executed in the observation data error correction section 40.

In step 700, Δ of each of the pairs to be used in the current positioning cycle is calculated. The pairs to be used in the current positioning cycle may be the same as the pairs used in the preceding positioning cycle, may be determined by another method, or may be randomly determined.

In step 702, it is determined whether there is Δ that is calculated in the above-described step 700, and the absolute value of which is greater than a predetermined threshold value β. The predetermined threshold value β corresponds to the error component Δ such that the integer solution is not fixed in the FIX determination section 48, and the predetermined threshold value β may be adjusted using the result of examination, analysis, etc. When there is Δ, the absolute value of which is greater than the threshold value β, the process proceeds to step 704. When there is no Δ, the absolute value of which is greater than the threshold value β, the process proceeds to step 706.

In step 704, it is determined that the pairs to be used in the current positioning cycle are not appropriate, and the pairs to be used in the current positioning cycle are changed. In this step, all the pairs may be changed, or alternatively, only the pair, of which the absolute value of Δ is greater than the predetermined threshold value β, may be replaced by another new pair. Such another new pair may be determined by the method described using FIG. 4, may be determined by another method, or may be randomly determined.

In step 706, it is determined that the pairs to be used in the current positioning cycle are appropriate, and the pairs to be used in the current positioning cycle are determined (settled) as the pairs to be used in the current positioning cycle.

According to the process shown in FIG. 7, it is possible to eliminate the pair, of which the error component Δ exceeds the predetermined threshold value β, in the observation data error correction section 40, and therefore, it is possible to realize highly accurate positioning in subsequent sections 44 and 46.

Figure 8:
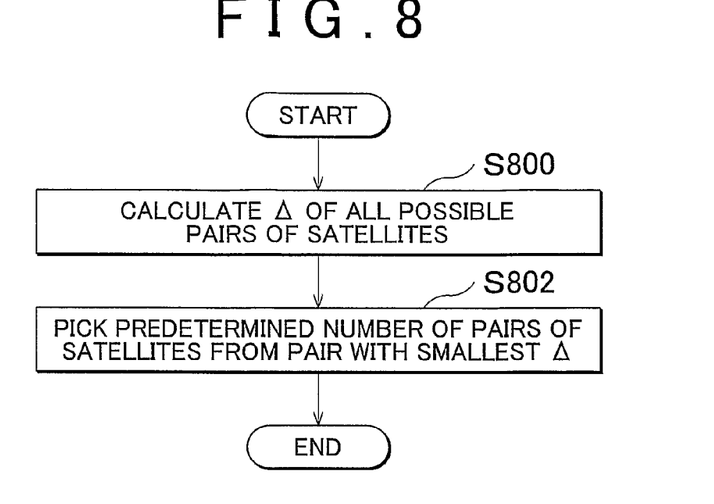
FIG. 8 is a flow chart showing another example of the pair determining process executed in the observation data error correction section 40.

FIG. 8 is a flow chart showing another example of the pair determining process executed in the observation data error correction section 40.

In step 800, Δ is calculated for each of all the possible pairs with the use of the common GPS satellites $10_i$ that are being observed by both the vehicle 20 and the vehicle 30. When the number of the common GPS satellites $10_i$ that are being observed by both the vehicle 20 and the vehicle 30 is N, for example, Δ is calculated for each of the pairs, the number of which is $_NC_2$ (C means combination).

In step 802, a predetermined number of pairs are determined, in the increasing order of Δ from the pair with the smallest Δ, as the pairs used in the current positioning cycle, based on Δ calculated in the above-described step 800. The predetermined number is the number of pairs used in the positioning, which may be a fixed value equal to or greater than four or may be a variable value equal to or greater than four.

According to the process shown in FIG. 8, it is possible to determine the pairs that give the smallest Δ in the observation data error correction section 40, and therefore it is possible to realize highly accurate positioning in subsequent sections 44 and 46.

Note that the process shown in FIG. 8 may be combined with the process shown in FIG. 7, for example. For example, a configuration may be adopted in which in the first positioning cycle, the pairs used in the positioning are determined by the process shown in FIG. 8, and in the subsequent positioning cycles, the pairs used in the positioning are determined by the process shown in FIG. 7. In this case, the pairs used in the preceding cycle (the pairs determined by the process shown in FIG. 8) may be determined as the pairs to be used in the current positioning cycle in step 700 of the process shown in FIG. 7, and when the pairs are changed in step 704, the pairs used in the positioning may be redetermined by the process shown in FIG. 8.

Figure 9:
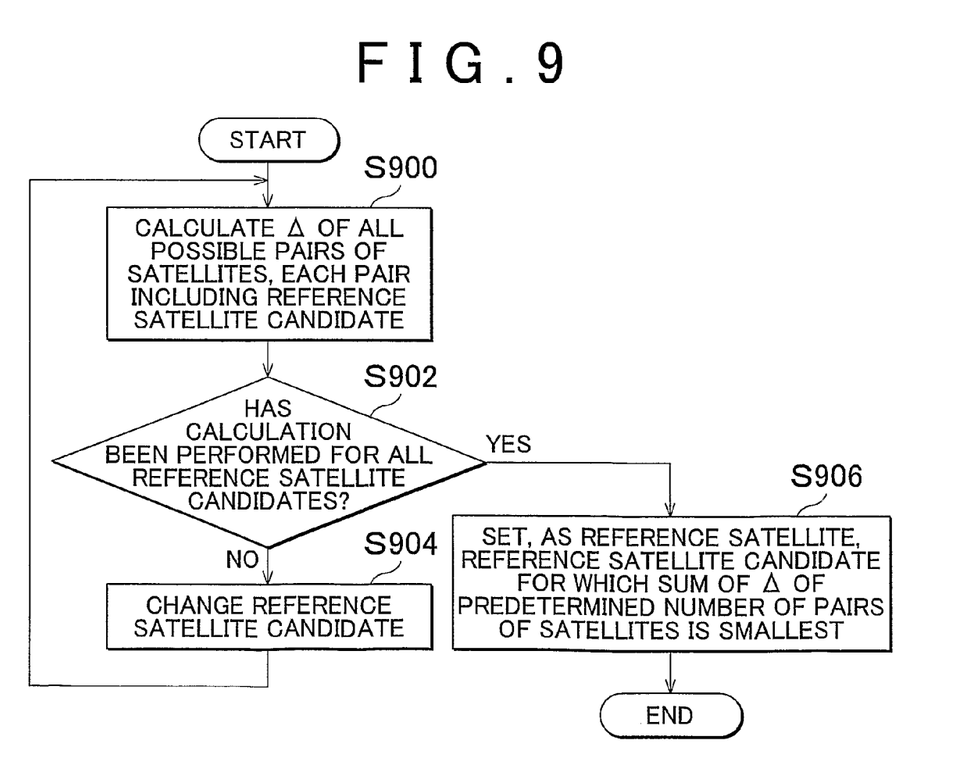
FIG. 9 is a flow chart showing another example of the pair determining process executed in the observation data error correction section 40.

FIG. 9 is a flow chart showing another example of the pair determining process executed in the observation data error correction section 40.

In step 900, when a particular GPS satellite $10_j$, among the common GPS satellites $10_i$ that are being observed by both the vehicle 20 and the vehicle 30, is selected as a reference satellite candidate, Δ is calculated for each of all the possible pairs, each of which includes the reference satellite candidate. When the number of the common GPS satellites $10_i$ that are being observed by both the vehicle 20 and the vehicle 30 is N, for example, Δ is calculated for each of the pairs, the number of which is N−1.

In step 902, it is determined whether all the common GPS satellites $10_i$ that are being observed by both the vehicle 20 and the vehicle 30 have been selected as the reference satellite candidate. If the determination result is positive, the process proceeds to step 906. If the determination result is negative, the process proceeds to step 904.

In step 904, the reference satellite candidate is changed and the process returns to step 900. In this way, every one of all the common GPS satellites $10_i$ that are being observed by both the vehicle 20 and the vehicle 30 is selected as the reference satellite candidate and Δ is calculated for each of all the possible pairs, each of which includes the reference satellite candidate.

In step 906, based on the result of calculation in the above-described step 900, for each reference satellite candidate, a predetermined number of pairs are extracted in the increasing order of the absolute value of Δ from the pair, of which the absolute value of Δ is the smallest, the sum (total value) of the absolute values of Δ of the extracted, predetermined number of pairs is calculated, and the reference satellite candidate, for which the sum is the smallest, is determined (set) as the reference satellite. The predetermined number is the number of pairs used in the positioning, which may be a fixed value equal to or greater than four or may be a variable value equal to or greater than four (note that the same number is used for all the reference satellite candidates).

According to the process shown in FIG. 8, it is possible to determine the pairs that give the smallest Δ in the case where the pairing method using a reference satellite is adopted, in the observation data error correction section 40, and therefore it is possible to realize highly accurate positioning in subsequent sections 44 and 46. In addition, the pairs that give the smallest Δ are determined in the case where the pairing method using the reference satellite is adopted, so that it is possible to set the most appropriate reference satellite and realize highly accurate positioning.

Note that the process shown in FIG. 9 may be combined with the process shown in FIG. 7, for example. For example, a configuration may be adopted in which in the first positioning cycle, the pairs used in the positioning are determined by the process shown in FIG. 9, and in the subsequent positioning cycles, the pairs used in the positioning are determined by the process shown in FIG. 7. In this case, the pairs used in the preceding cycle (the pairs determined by the process shown in FIG. 9) may be determined as the pairs to be used in the current positioning cycle in step 700 of the process shown in FIG. 7, and when the pairs are changed in step 704, the pairs used in the positioning may be redetermined by the process shown in FIG. 9.

While preferable embodiments of the invention have been described in detail, the invention is not limited to the above-described embodiments, and it is possible to make various modifications and substitutions to the above-described embodiments without departing from the scope of the invention.

For example, while in the above-described embodiments, the real solutions are calculated by the ordinary weighted least square method using the weight matrix in which $\Delta$ is reflected in the weights, real solutions may be calculated by the ordinary least square method without using the weight matrix W (that is, the weight matrix W is the identity matrix). This is because when the pairs that give small $\Delta$ as described above are determined, the influence of the error component $\Delta$ is suppressed and highly accurate positioning result can be expected even when no weight matrix W is used. Conversely, when a weight matrix W is used in which $\Delta$ is reflected in the weights, there is no need to use the pair determining method such that $\Delta$ become small as described above. Specifically, when a weight matrix W in which $\Delta$ is reflected in the weights is used, the pairs that are used in positioning may be determined in a random manner (or by a different determining method). Note that also in this case, it is preferable that the pair for which $\Delta$ becomes higher than the predetermined threshold value $\beta$ be changed to another pair. The weights in the weight matrix W may be determined depending on another parameter (angle of elevation and/or dilution of precision (DOP), for example).

While the above embodiment is a preferable embodiment, in which the real solutions of the integer ambiguities are calculated by an instantaneous positioning method, there are various methods of calculating the real solutions of the integer ambiguities and another method than the above-described one may be used. For example, a method may be used in which the double difference $\Phi^{jh}_{ku}$ of the phase accumulation value is used and the double difference $\rho^{jh}_{ku}$ of the pseudorange is not used. When the GPS receivers 22 and 32 are double frequency receivers that can receive both the L1 wave and the L2 wave (frequency: 1227.6 MHz) emitted from the GPS satellites 10, the double difference $\Phi^{jh}_{ku}$ of the phase accumulation value of the L2 wave may be additionally or substitutionally used as the observed amount Z. Alternatively, the double difference $\Phi^{jh}_{ku}$ of the phase accumulation value of another band carrier wave (radio wave of L5 band that is planned to be added in the future) may be additionally or substitutionally used as the observed amount Z. Similarly, also with regard to the double difference $\rho^{jh}_{ku}$ of the pseudorange, the single or double difference $\rho^{jh}_{ku}$ of the pseudorange based on the pseudo random noise (PRN) code, such as P code, other than, but similar to, the C/A code may be additionally or substitutionally used as the observed amount Z. While the influence of the clock error, the initial phase of the oscillators in the GPS receivers 22 and 32, etc. is eliminated by taking the double difference as described above in the above-described method of calculating the real solutions of the integer ambiguities, a configuration may be adopted in which a single difference is taken. While, in the above method, the influence of the ionosphere refraction, the troposphere refraction, and the multipath is ignored, this may be taken into consideration. In another embodiment, a Kalman filter may be used instead of the least square method. In this case, in order not for the estimation (positioning) result at the preceding epoch to affect the estimation result at the current epoch, instantaneous positioning may be implemented in which the initialization of the state variables and the error covariance matrix is performed at every epoch, or a configuration may be adopted in which the initialization of the state variables and the error covariance matrix is not performed and the state variables and the error covariance matrix are updated (passed) at every epoch by using a normal Kalman filter. In addition, in order to take the kinetic state quantities characteristic of a vehicle due to the movement of the vehicle 30 into consideration, the kinetic state quantities, such as the moving speed of the vehicle, that are obtained using the vehicle sensors (vehicle speed sensor, acceleration sensor, etc.) mounted on the vehicle 30 may be input to the Kalman filter as the known input. A mobile body model used to estimate the current state of a vehicle 30 from the travel history of the vehicle 30 may be input to the Kalman filter. In this case, the mobile body model may be constructed using arbitrary parameters, such as position, speed, acceleration, jerk (derivative of acceleration), that describe the travel condition of the vehicle 30. For example, a mobile body model may be constructed on the assumption that speed v of the vehicle 30 is determined by the first-order Markov process, and the mobile body model may be input to the Kalman filter.

Part of the various processes executed on the vehicle 20 side in the above-described embodiment may be executed on the vehicle 30 side, and part of the various processes executed on the vehicle 30 side in the above-described embodiment may be executed on the vehicle 20 side. For example, the observation data that is observed on the vehicle 30 side may be supplied from the vehicle 30 side to the vehicle 20 side and the positioning process may be executed on the vehicle 20 side. In this case, the positioning result is supplied from the vehicle 20 side to the vehicle 30 side through inter-vehicle communication. The positioning (point positioning) of the vehicle 20 may be performed on the vehicle 30 side.

While the above-described embodiment concerns the inter-vehicle RTK positioning between two vehicles 20 and 30, the invention can be used in the situation where three or more mobile bodies exist. When three or more mobile bodies exist, similar inter-vehicle RTK positioning may be performed independently between each pair of the mobile bodies, or inter-vehicle RTK positioning may be performed among the three or more mobile bodies in a cooperative manner. In the latter case, when there is a third vehicle in addition to the vehicles 20 and 30, for example, the vehicle 20 may function as the reference station for both of the vehicle 30 and the third vehicle.

While the above-described embodiment concerns the inter-vehicle RTK positioning between two vehicles 20 and 30, there may be a third mobile body (vehicle, for example) or a fixed station capable of communicating with the vehicles 20 and 30, and the third mobile body or the fixed station may execute the various processes executed on the vehicle 20 side and/or the various processes executed on the vehicle 30 side. For example, the third mobile body or the fixed station may acquire the observation data from both the vehicles 20 and 30 and perform functions of the sections 40, 42, 44, 46, and 48 on the vehicle 30 side. In this case, the positioning result obtained in the third mobile body or the fixed station may be supplied from the third mobile body or the fixed station to the vehicle 20 and/or the vehicle 30 through radio communication.

While the above-described embodiment shows an example in which the invention is applied to GPS, the invention can be applied to a satellite system other than GPS, such as another Global Navigation Satellite System (GNSS), which is Galileo, for example.

The invention claimed is:

1. An inter-mobile body carrier phase positioning device comprising:
   a first observation data acquisition section that acquires observation data that is observed in a first mobile body, wherein the first observation data acquisition section determines a phase accumulation value of a carrier wave of a satellite signal;
   a second observation data acquisition section that acquires observation data that is observed in a second mobile body, wherein the second observation data acquisition section determines a phase accumulation value of the carrier wave of the satellite signal;
   a satellite pair determination section that determines pairs of satellites used for carrier phase positioning;
   a carrier phase positioning section that (i) takes, between each of the pairs of the satellites determined by the satellite pair determination section, a single difference or a double difference between the observation data acquired by the first observation data acquisition section and the observation data acquired by the second observation data acquisition section, and (ii) determines relative positional relation between the first mobile body and the second mobile body by carrier phase positioning with the use of the single difference or the double difference of the observation data; and
   a regulating section that regulates an effect of the single difference or the double difference of the observation data, taken for each of the pairs, on positioning result, by using weights, wherein
      the weights are determined based on a difference between reciprocals of distances between the first mobile body and the pair of the satellites for each of the pairs of the satellites determined by the satellite pair determination section.

2. The inter-mobile body carrier phase positioning device according to claim 1, wherein:
   the observation data acquired by the first observation data acquisition section and the observation data acquired by the second observation data acquisition section both include determination data on phase accumulation values of the carrier waves of common satellites and determination data on pseudoranges of the common satellites; and
   the relative positional relation is determined by an instantaneous positioning method in which the observation data are used independently for each epoch.

3. The inter-mobile body carrier phase positioning device according to claim 1, wherein:
   the carrier phase positioning section determines the relative positional relation with the use of position information of the first mobile body obtained by point positioning along with the single difference or the double difference of the observation data; and
   the position information of the first mobile body obtained by the point positioning is obtained by the point positioning using only the satellites included in the pairs determined by the satellite pair determination section.

4. The inter-mobile body carrier phase positioning device according to claim 1, wherein the satellite pair determination section determines the pairs of the satellites based on the distance between the first mobile body and each of the satellites.

5. The inter-mobile body carrier phase positioning device according to claim 4, wherein the satellite pair determination section pairs two satellites such that a difference between distances from the first mobile body to the two satellites is minimized.

6. The inter-mobile body carrier phase positioning device according to claim 4, wherein the satellite pair determination section pairs two satellites such that a difference between reciprocals of distances from the first mobile body to the two satellites is minimized.

7. The inter-mobile body carrier phase positioning device according to claim 4, wherein the satellite pair determination section preferentially selects the satellite, from which a distance to the first mobile body is the greatest, to incorporate into the pairs.

8. The inter-mobile body carrier phase positioning device according to claim 4, wherein when a difference between reciprocals of distances from the first mobile body to a pair of the satellites exceeds a predetermined threshold value, the satellite pair determination section replaces the pair of the satellites by another pair of the satellites.

9. The inter-mobile body carrier phase positioning device according to claim 4, wherein when an integer solution derived in the carrier phase positioning section is not fixed, the satellite pair determination section preferentially selects and uses the satellite, from which a distance to the first mobile body is the greatest, to redetermine the pairs.

10. The inter-mobile body carrier phase. positioning device according to claim 1, wherein:
    the inter-mobile body carrier phase positioning device is mounted on the second mobile body;
    the first observation data acquisition section of the inter-mobile body carrier phase positioning device acquires the observation data through radio communication with the first mobile body; and
    the second observation data acquisition section of the inter-mobile body carrier phase positioning device acquires the observation data through observation of the satellite signal.

11. An inter-mobile body carrier phase positioning method comprising:
    acquiring first observation data on a satellite signal observed in a first mobile body;
    acquiring second observation data on a satellite signal observed in a second mobile body;
    determining pairs of satellites used for carrier phase positioning based on distances from the first mobile body to the satellites so that two of the satellites that are close to each other in terms of the distances are paired;
    taking, between each of the determined pairs of the satellites, a single difference or a double difference between the first observation data and the second observation data, and determining relative positional relation between the first mobile body and the second mobile body by carrier phase positioning; and
    regulating an effect of the single difference or the double difference of the observation data, taken for each of the pairs, on positioning result, using weights, wherein
       the weights are determined based on a difference between reciprocals of distances between the first mobile body and the pair of the satellites for each of the pairs of the satellites determined.

\* \* \* \* \*